(12) United States Patent
Monteiro Veras et al.

(10) Patent No.: US 12,517,104 B2
(45) Date of Patent: Jan. 6, 2026

(54) GRAIN PARTICLE GRANULOMETRY MEASUREMENT SYSTEM, GRAIN COLLECTION, MOVEMENT, AND MEASUREMENT SYSTEM, AND GRAIN PARTICLE GRANULOMETRY MEASUREMENT METHOD

(71) Applicant: Bunge SA, Geneva (CH)

(72) Inventors: Rafael Monteiro Veras, Florianópolis (BR); Artur Antonio Seibert, Florianópolis (BR); André Luís Molgaro, Florianópolis (BR); Flávio Gabriel Oliveira Barbosa, Florianópolis (BR); Carlos Fernando Oliveira Cabeça Neves, Florianópolis (BR); Renan Bonnard, Florianópolis (BR)

(73) Assignee: BUNGE SA, Geneva (CH)

( * ) Notice: Subject to any disclaimer, the term of this patent is extended or adjusted under 35 U.S.C. 154(b) by 323 days.

(21) Appl. No.: 18/278,576

(22) PCT Filed: Feb. 23, 2022

(86) PCT No.: PCT/BR2022/050057
§ 371 (c)(1),
(2) Date: Aug. 23, 2023

(87) PCT Pub. No.: WO2022/178609
PCT Pub. Date: Sep. 1, 2022

(65) Prior Publication Data
US 2024/0295537 A1 Sep. 5, 2024

(30) Foreign Application Priority Data
Feb. 23, 2021 (BR) .......................... 102021003359-2

(51) Int. Cl.
*G01N 33/02* (2006.01)
*G06T 7/00* (2017.01)
*G06T 7/11* (2017.01)

(52) U.S. Cl.
CPC ......... *G01N 33/025* (2013.01); *G06T 7/0004* (2013.01); *G06T 7/11* (2017.01);
(Continued)

(58) Field of Classification Search
CPC ....... G01N 33/025; G06T 7/11; G06T 7/0004; G06T 2207/10024; G06T 2207/30128
See application file for complete search history.

(56) References Cited

U.S. PATENT DOCUMENTS 10,085,379 B2 * 10/2018 Schleusner ........ A01D 41/1271
10,143,135 B2 * 12/2018 Xu ..................... A01D 41/1277
(Continued)

FOREIGN PATENT DOCUMENTS

CN 111435427 A 7/2020
EP 3038054 A2 6/2016

OTHER PUBLICATIONS

Chen Jin et al: "Real-time grain impurity sensing for rice combine harvesters using image processing and decision-tree algorithm", Computers and Electronics in Agriculture, Elsevier, Amsterdam, NL, vol. 175, Jun. 23, 2020 (Jun. 23, 2020), XP086220847, ISSN: 0168-1699, DOI: 10.1016/J.COMPAG.2020.105591.
(Continued)

*Primary Examiner* — Gregory M Desire
(74) *Attorney, Agent, or Firm* — GrowIP Law Group LLC

(57) ABSTRACT

This invention describes a particle granulometry measurement system (100), a collection, movement, and measurement system (200) and a grain particle granulometry measurement method run through a cracking process in order to define their particle granulometry and analyze its function-
(Continued)

ing. The grain particle granulometry measurement system (100) comprises an image collection device (110) configured to collect images from a plurality of grains; and a command unit (120) configured to receive images from the plurality of grains collected through the image collection device (110) and perform a particle granulometry measurement of the plurality of grains. The grain collection, movement and measurement system (200) comprises: a grain collection device (210); the separator device (230); a measurement device (130); and a command unit (120). The grain particle granulometry measurement method comprises the steps of: collecting (540) an image of the plurality of grains through image collection device; and measuring (541) the particle granulometry of each grain of the plurality of grains through the collected image.

5 Claims, 3 Drawing Sheets

(52) U.S. Cl.
CPC ............... *G06T 2207/10024* (2013.01); *G06T 2207/30128* (2013.01)

(56) References Cited

U.S. PATENT DOCUMENTS

| | | | | |
|---|---|---|---|---|
| 10,902,575 | B2* | 1/2021 | Leshem | A01D 41/127 |
| 10,989,833 | B2* | 4/2021 | Ferren | H04N 23/56 |
| 11,170,496 | B2* | 11/2021 | Hadar | G06V 20/56 |
| 11,650,189 | B2* | 5/2023 | Da Silva | G01N 33/025 |
| | | | | 209/233 |
| 12,063,879 | B2* | 8/2024 | Nienstermann | A01C 17/008 |
| 12,067,701 | B2* | 8/2024 | Leshem | H04N 23/57 |

OTHER PUBLICATIONS

Du C-J et al: "Recent developments in the applications of image processing techniques for food quality evaluation", Trends in Food Science and Technology, Elsevier Science Publishers, GB, vol. 15, No. 5, May 1, 2004 (May 1, 2004), pp. 230-249, XP004499338, ISSN: 0924-2244, DOI: 10.1016/J.TIFS.2003.10.006.

Lingmin Liu et al: "A Vision Method for Rapeseed Amount Measuring", 2020 5th International Conference on Control, Robotics and Cybernetics (CRC), IEEE, Oct. 16, 2020 (Oct. 16, 2020), pp. 207-210, XP033858000, DOI: 10.1109/CRC51253.2020.9253481.

* cited by examiner

GRAIN PARTICLE GRANULOMETRY MEASUREMENT SYSTEM, GRAIN COLLECTION, MOVEMENT, AND MEASUREMENT SYSTEM, AND GRAIN PARTICLE GRANULOMETRY MEASUREMENT METHOD

This invention refers to a particle granulometry measurement system, a collection, movement, and measurement system, and a particle granulometry measurement method for grains run through a cracking process, in order to define their particle granulometry and analyze its functioning.

BACKGROUND ART

The methods for measuring the grain particle granulometry, for example, cracked soybeans, which are widely known and used at the prior art, involve non-automated measurement of the grains. This non-automated measurement method requires the practical training and development of qualified workers skilled in obtaining information from the measured matter, cracked grains in this case. This need leads to dependence on a skilled worker who is trained and qualified to handle this job. Furthermore, human errors associated with measurements, process slowdowns, and possible non-measurements increase the inefficiency of non-automated methods, causing losses to the industry.

In order to enhance efficiency and lessen possible human errors, several types of equipment have been developed at the prior art. An example of a device at the prior art, more specifically a device for defining particle granulometry, is described in document BR 112012011440-9. This document describes a process and a device for determining particle granulometry distribution and a unit for sampling a product stream diverted from a flow line. A formation step is described for data measured through the detection of at least one portion of the particles, wherein the measurement data are generated at least through optical detection of part of the particles through at least two different optical measurement methods.

Another example of a device at the prior art is described in U.S. Pat. No. 6,061,130. This document describes a device for defining particle granulometry distribution and characterizing the particle forms of a particle mixture. The device has a measurement apparatus for classifying a particle mixture in the flow of particles to the device. An opto-electronic measurement section is described, which has a light source and a device for collecting images aligned with each other, wherein the particle flow is steered between the light source and the image collection device. The image collection device has a plurality of electro-optical image recording units directed towards the particle flow and with different image recording scales combined among themselves in order to cover the entire device measurement range.

However, the processes and devices at the prior art do not describe a grain particle granulometry measurement system, a grain particle granulometry measurement method or a grain collection, movement, and measurement system that collect images of a plurality of grains and perform a color segmentation process of the images collected by the image collection device, together with a binary image edge segment topological structural analysis. Consequently, the measurement of the particle granulometry of the plurality of grains might not be measured in an efficient and accurate manner.

Purposes of the Invention

In view of the problems described at the prior art, the purpose of this invention is to provide a grain particle granulometry measurement system, a grain collection, movement, and measurement system, and a grain particle granulometry measurement method able to perform a grain particle granulometry measurement, based on color segmentation of the images collected by the image collection device, together with a binary image edge segment topological structural analysis.

The grain particle granulometry measurement proposed by the systems and method addressed by this invention results in more precise and efficient grain measurements, such as cracked soybeans for example, in addition to being performed in an automated and continuous manner.

BRIEF DESCRIPTION OF THE INVENTION

This invention refers to a grain particle granulometry measurement system that comprises an image collection device and a command unit. The image collection device is configured to collect images of a plurality of grains. The command unit is configured to receive the images of the plurality of grains collected through the image collection device and perform a particle granulometry measurement of the plurality of grains, based on a color segmentation and a binary image edge segment topological structural analysis of the collected images. The color segmentation of the image of the plurality of grains collected may be a color segmentation in the HSV space.

The command unit may be configured to handle the receipt and return of the plurality of grains in the grain particle granulometry measurement system in an automated and continuous manner.

Furthermore, the command unit may be configured to generate a grain contour for each grain in the plurality of grains, calculating the number of pixels that each grain in the plurality of grains occupies, based on the collected images. The command unit may also be configured to define a pixel per milliliter ratio for each grain in the plurality of grains, based on the collected images. The command unit may also be configured to define a minimum rectangle surrounding each grain in the plurality of grains, based on the collected images.

This invention also refers to a grain collection, movement, and measurement system that comprises a grain collection device, a separator device, a measurement device, and a command unit. The grain collection device comprises at least one valve configured to remove a plurality of grains from an external grain flow. The separator device is configured to remove unwanted particles from the plurality of grains by blowing air. The measurement device comprises an image collection device configured to collect images of a plurality of grains analyzed. The command unit is connected to the grain collection device, the separator device, and the measurement device, in a manner whereby it controls the grain collection, movement, and measurement system. The command unit is configured to receive the images of the plurality of grains collected through the measurement device and perform a particle granulometry measurement of the plurality of grains.

In the grain collection, movement, and measurement system, the particle granulometry measurement of the plurality of grains may be performed, based on a color segmentation in the HSV space and a binary image edge segment topological structural analysis of the image of the plurality of grains collected. Furthermore, the grain collection device may comprise a set of piping with asymmetrical valves configured to direct the external flow of grains to the grain collection, movement, and measurement system. The separator device may comprise a blower, wherein the blower provides the air displacement.

The grain collection, movement, and measurement system may also comprise a dosing device connected to the command unit, wherein the dosing device comprises at least one helicoidal thread and a motor connected to the helicoidal thread, wherein the helicoidal thread is powered by the action of the motor, whereby it regulates the quantity of grains in the plurality of grains analyzed.

The command unit may be configured to control the receipt and return of the plurality of grains in the grain collection, movement, and measurement system in an automated and continuous manner.

This invention refers to a method for measuring the grain particle granulometry that comprises the steps of: collecting an image of a plurality of grains through an image collection device; and measuring the particle granulometry of each grain in the plurality of grains through the collected image. A step of measuring the particle granulometry of each grain is performed by a color segmentation process and a binary image edge segment topological structural analysis of the image of the plurality of grains collected. The color segmentation of an image of the plurality of grains collected is a color segmentation in the HSV space.

The grain particle granulometry measurement method may also comprise a step of extracting a grain contour for each grain in the plurality of grains and a step of defining a number of pixels occupied by each grain in the plurality of grains, through the image of the plurality of grains collected. The grain particle granulometry measurement method may also comprise a step of defining a pixel per milliliter ratio for each grain in the plurality of grains through the image of the plurality of grains collected and identifying the real area occupied by each grain. Furthermore, the grain particle granulometry measurement method may comprise a step of defining a minimum rectangle surrounding each grain in the plurality of grains through the image of the plurality of grains collected.

BRIEF DESCRIPTION OF THE DRAWINGS

This invention will be described in greater detail below, based on an example of its embodiment, shown in the drawings. The Figures display.

DETAILED DESCRIPTION OF THE DRAWINGS

Figure 1:
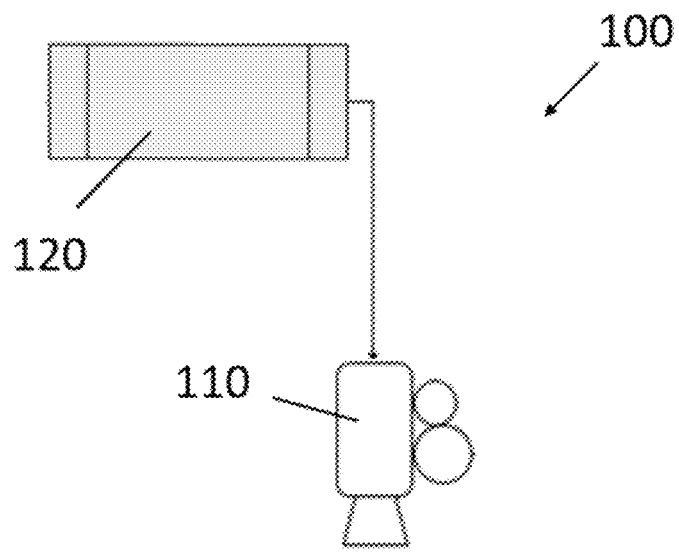
FIG. 1—is a schematic diagram of an embodiment of the grain particle granulometry measurement system addressed by this invention.

FIG. 1 shows a schematic diagram of the grain particle granulometry measurement system 100 according to an embodiment of this invention. In this example of an embodiment, the grain particle granulometry measurement system 100 comprises an image collection device 110 and a command unit 120.

The command unit 120 and the image collection device 110 are connected in a manner whereby the command unit 120 controls the operation of the image collection device 110 and the image collection device 110 sends information to the command unit 120. This control is handled through a signal transmission, which may be handled by remote or physical connections, not being limited to any specific signal transmission type.

The image collection device 110 is a remote sensing device or an optical instrument that can collect, store, and/or send images. In one embodiment addressed by this invention, the image collection device 110 handles the measurement of a plurality of grains, such as cracked soybeans, for example, by collecting images of this plurality of grains.

Consequently, the image collection device 110 is configured to collect images of the plurality of grains and store and/or send the images collected a command unit 120 for processing. An example of an image collection device 110 is a camera that comprises a lens to capture the desired images and store such images externally, and/or send such images to the external device, such as, for example, the command unit 120.

The command unit 120 that comprises elements that allow the receipt of information from items of equipment, controlled or not by the command unit 120, processing the received information, analyzing the information through programmed instructions, and forwarding the information to other items of equipment, such as an information presentation device, for example.

The elements that may comprise the command unit 120 include a programmable logic controller (PLC), electronic boards, relay cards, and a power source, sensors, among others. The command unit 120 also comprises a set of executable instructions controlling the acquisition, handling, control, redirection, and/or modification of the received information.

The combination of the image collection device 110, configured to collect images of the plurality of grains, with the command unit 120, configured to receive the images of the plurality of grains collected through the image collection device 110, in the grain particle granulometry measurement system 100 allows the collection of images of the plurality of grains through the image collection device 110 and sending the collected images to the command unit 120 for processing. Based on the images received by the command unit 120, the set of executable instructions for the command unit 120 is configured to perform tasks programmed in the PLC, in a manner whereby it performs a particle granulometry measurement of the plurality of grains.

In one embodiment addressed by this invention, the command unit 120 performs the particle granulometry measurement for each grain in the plurality of grains, based on a color segmentation of the images collected by the image collection device 110, together with the binary image edge segment topological structural analysis.

The color segmentation analysis is used by the command unit 120 to encode the collected digital image. This may take place, in the HSV space, for example. The HSV color system is formed by the "hue", "saturation" and "value" components respectively, and defines the color space using these three parameters.

Figure 2:
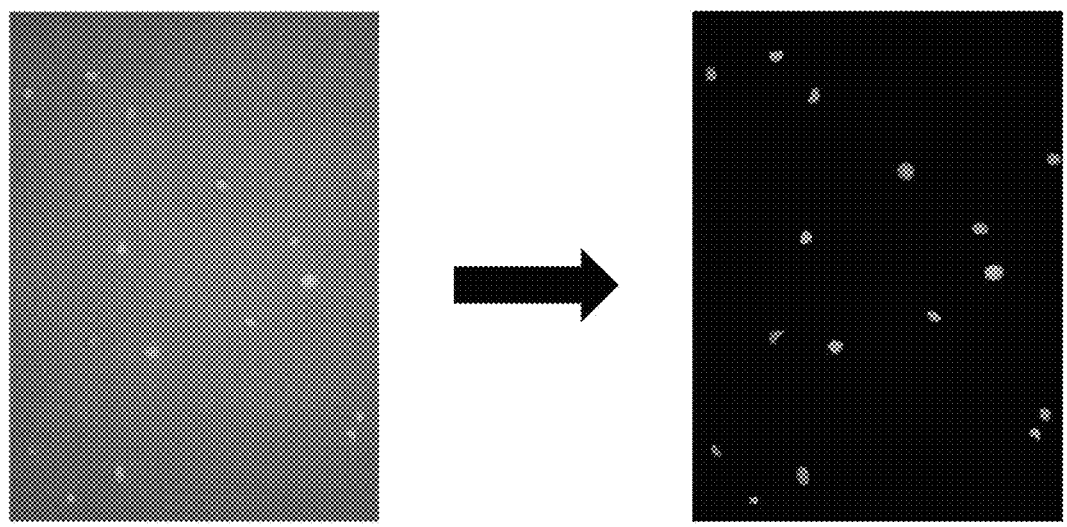
FIG. 2—is an example of images collected by the grain particle granulometry measurement system in one embodiment addressed by this invention.

Performing a color segmentation implies adapting to known parameters the colors obtained in the pixels that comprise the digital image, which in this case translates into separating what may be considered the grain from what may be considered the background of the image. The binary image edge segment topological structural analysis is a sequence of instructions performed by the command unit 120 to define the grain contours. FIG. 2 presents the outcome of these operations.

The hypothesis used is that grains with different meshes (the screening or sieving measurement used to define grain granulometries) occupy areas in different pixels on a surface. Consequently, when splitting a larger sample into multiple subsamples that are spread over a surface, the image of the scene allows an estimate of the area of each grain, assigning it to the respective mesh. After repeating the process for all the subsamples, the mesh percentage distribution is obtained for the complete sample.

The combination of the color segmentation in the HSV space with the binary image edge segment topological structural analysis allows the command unit 120 to extract the contour of each grain in the plurality of grains and the number of pixels occupied by each grain in the plurality of grains.

Using an object with a known area to calibrate the grain particle granulometry measurement system 100 addressed by this invention, the command unit 120 can define a pixel per milliliter ratio for each grain in the plurality of grains, based on the collected images. This ratio allows the command unit 120 identifying the real area occupied by each grain.

Furthermore, the command unit 120 can define a minimum rectangle surrounding each grain in the plurality of grains, based on the collected images. Obtaining the minimum rectangle for each grain in the plurality of grains allows the magnitudes obtained to be correlated with a screen, an instrument at the prior art used to obtain the particle granulometry of a grain, more specifically cracked soybeans.

These analyses performed by the tasks programmed in the command unit 120 result in a grain particle granulometry measurement that is more precise and efficient than the measurements known at the prior art.

Figure 3:
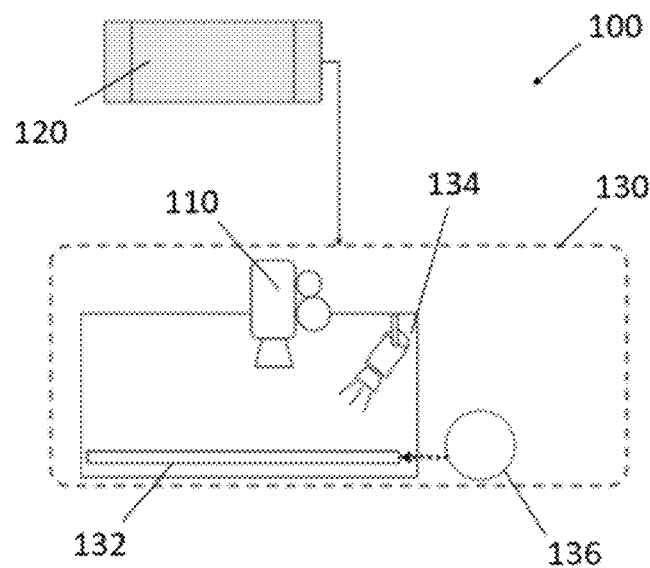
FIG. 3—is a schematic diagram of another embodiment of the grain particle granulometry measurement system addressed by this invention.

Another example of an embodiment of the grain particle granulometry measurement system 100 addressed by this invention is shown in FIG. 3. In this embodiment, the grain particle granulometry measurement system 100 that comprises a measurement device 130 that comprises the image collection device 110. In addition to the image collection device 110, the measurement device 130 that comprises a support structure 132, a plurality of cameras and lenses, an internal lighting device 134, and a motor 136.

The support structure 132 is a structure configured to receive the plurality of grains, whereby the image collection device 110 can collect images of the plurality of grains. Consequently, the support structure 132 is positioned on the measurement device 130, in a manner whereby the image collection device 110 can collect images of the plurality of grains.

In one embodiment, the support structure 132 is a structure made from aluminum with acrylic sheets. However, the support structure 132 is not limited to these materials, whereby it is possible to use any material that results in a similar technical effect. For example, the acrylic sheets allow visual access to the grains through the image collection device 110, while providing physical protection for the external surroundings.

In one embodiment of the grain particle granulometry measurement system 100 that comprises the plurality of cameras and lenses, the measurement device 130 can capture images of the plurality of grains from different angles, and/or capture images of the plurality of grains with purposes additional to those already describes. Images captured from different angles may result in more accurate measurements, and endow the measurement system with additional advantages. Furthermore, cameras that capture light outside the visible spectrum may also be used, not being limited to one specific type of camera.

The internal lighting device 134 for the system is any source that can provide suitable lighting for the plurality of grains while images of the plurality of grains are being captured by the image collection device 110. With regard to its positioning on the measurement device 130, the lighting device is positioned in a manner that allows correct lighting of the plurality of grains while the images are being captured.

The lighting device may be a primary light source, such as a lightbulb, for example, or a secondary light source. Furthermore, the lighting device may be controlled by the command unit 120 or alternatively by another means of control included in the grain particle granulometry measurement system 100 addressed by this invention.

The support structure 132 and the motor 136 in the grain particle granulometry measurement system 100 addressed by this invention are positioned alongside each other, whereby the motor 136 can move the support structure 132. The function of the motor 136 is to move the support structure 132 that comprises the plurality of grains, when necessary. Consequently, the motor 136 must be positioned in terms of the support structure 132 in a manner that allows the motor 136 to access the region where the plurality of grains is found, when the image is collected. An example of the use of the motor 136 is at the time when the plurality of grains returns to the processes that take place within or in addition to the grain particle granulometry measurement system 100.

Although the use of the motor 136 has been described for returning the plurality of grains to the process, other means may also be used to move the plurality of grains in the system, whereby the collection of images by the image collection device 110 is not significantly altered or adversely affected.

Figure 4:
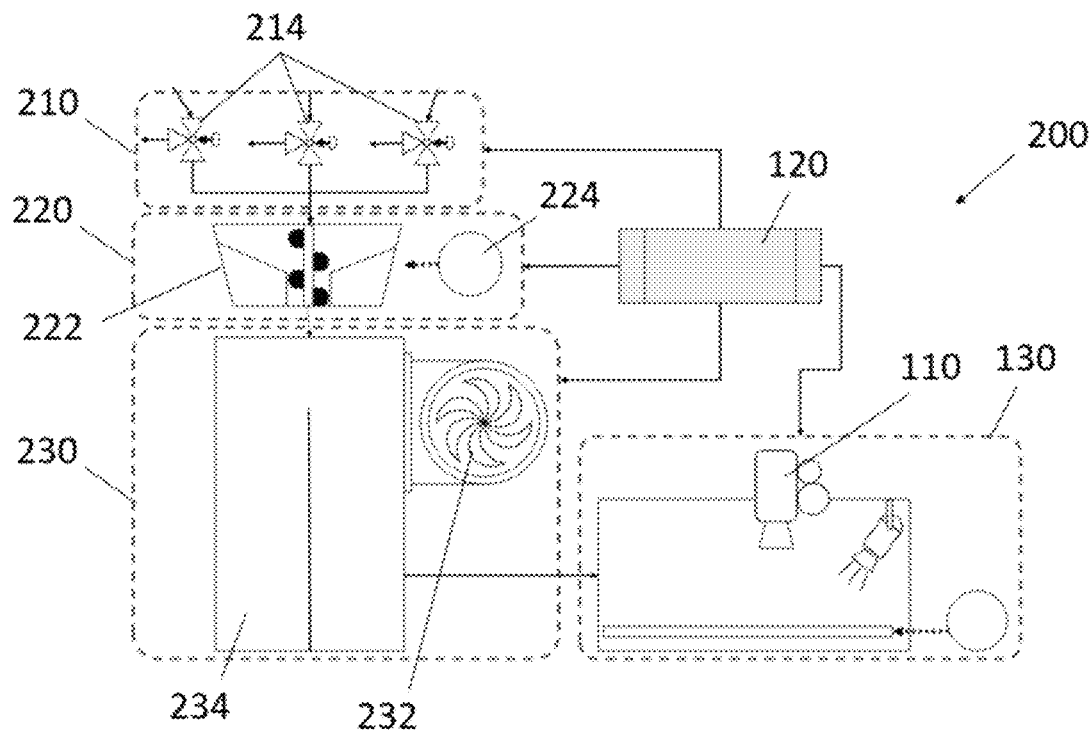
FIG. 4—is a schematic diagram of an embodiment of a grain collection, movement, and measurement system addressed by this invention.

FIG. 4 shows a schematic diagram of the grain collection, movement, and measurement system 200 according to an embodiment of this invention. In this embodiment, as shown in FIG. 4, a grain collection, movement, and measurement system 200 that comprises the grain particle granulometry measurement system 100.

Consequently, the characteristics already described for the grain particle granulometry measurement system 100 are included in the grain collection, movement, and measurement system 200 addressed by this invention. Furthermore, additional, complementary, and/or alternative characteristics are also present in the grain collection, movement, and measurement system 200, whereby the links, the connections, and the interactions of the devices result in the above-mentioned purposes.

In one embodiment, the grain collection, movement, and measurement system 200, comprises, in addition to the command unit 120 and the measurement device 130, a grain collection device 210, a dosing device 220, and a separator device 230. In this embodiment, the measurement device 130, the grain collection device 210, the dosing device 220, and the separator device 230 are connected to the command unit 120, whereby the command unit 120 controls the operations of all the devices in the system and can receive information from these devices.

As already mentioned, the control performed by the command unit 120 is handled through signal transmissions on physical remote connections, not being limited to any specific signal transmission type.

The grain collection device 210 is the device that removes a sample of a plurality of grains from an external flow of grains. The external flow of grains is a flow that originates in external systems for devices, adapted or not to interact with a grain collection, movement, and measurement system 200. To do so, in one embodiment, the grain collection device 210 comprises a set of piping with at least one valve 214 configured to remove a plurality of grains from an external grain flow. At least one valve 214 is an asymmetrical valve 214 configured to divert the external flow and direct it to the grain collection, movement, and measurement system 200.

In one embodiment, the grain collection device 210 piping comprises three asymmetrical valves 214. However, the grain collection device 210 is not limited to this number and type of valve, and may operate with different configurations that allow the external flow of grains to be diverted into the grain collection, movement, and measurement system 200.

The dosing device 220 handles the dosing or regulation of the quantity of grains included in the sample of the plurality of grains sent to subsequent devices, such as the separator device 230, or the measurement device 130, for example. In one embodiment, the dosing device 220 comprises a helicoidal thread 222 and a motor 224 that drives the helicoidal thread 222. The dosing occurs when the motor 224 activates the helicoidal thread 222, in a manner that allows only part of the sample of the plurality of grains to pass through, coming from the collection device. In this way, the command unit 120 controls the number of grains from the plurality of grains that will be analyzed and/or measured by the measurement unit through the dosing device 220.

Despite having described this type of dosing in this embodiment of the dosing device 220, other known means of dosing or regulating grain samples may also be used, whereby the grain collection, movement, and measurement system 200 is not limited to the type of dosing device 220 described herein.

The separator device 230 is a device configured to remove unwanted particles from the plurality of grains. The plurality of grains is part of the sample removed from the external flow by the grain collection device 210. Consequently, the separator device 230 receives the plurality of grains from the dosing device 220 or the grain collection device 210, depending on the system configuration, and removes unwanted particles, such as grain husks, for example, which may adversely affect the analyses to be performed by the command unit 120.

In one embodiment, the removal of the unwanted particles is performed by air displacement, through the use of a blower 232, a fan, or any other means of creating air displacement, which results in the removal of the unwanted particles from the plurality of grains. In addition to the blower 232, the separator device 230 also comprises an aluminum and acrylic structure 234. The aluminum and acrylic structure 234 is configured in a manner whereby it carries the soybeans collected from the dosing device 220 to the measurement device 130. Furthermore, the aluminum and acrylic structure 234 serves as a support for the blower 232.

Figure 5:
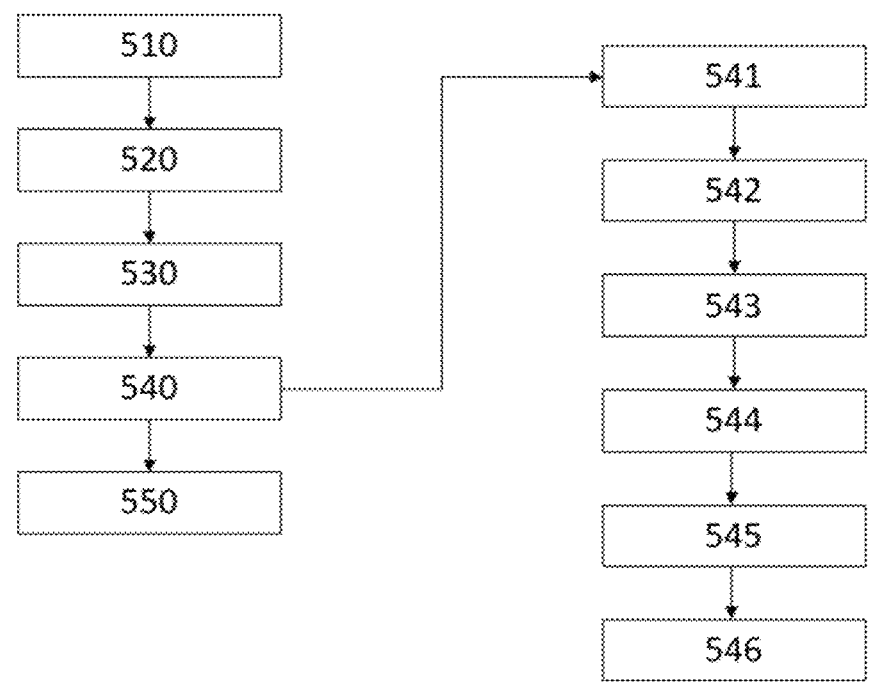
FIG. 5—is a sequence of steps for an embodiment of the grain particle granulometry measurement method addressed by this invention.

FIG. 5 shows the grain particle granulometry measurement method according to an embodiment of this invention. In this embodiment, the sequence of steps begins with a step of removing 510 the sample of the plurality of grains from the external flow of grains through the grain collection device. The removal of the sample from the plurality of grains may occur through the asymmetrical valves on the grain collection device piping, for example.

In one embodiment, after removing the sample of the plurality of grains from the external flow, the plurality of grains is directed to the dosing device. Next comes a step of dosing 520 the quantity grains from the plurality of grains that will be sent on to the next step in the measurement method. Dosing is performed by the dosing device through the helicoidal thread activated by the motor, allowing the command unit to control the quantity of grains that will continue on to the next step.

In one configuration, the measurement method also comprises a step of removing 530 unwanted particles from the plurality of grains. This step is performed by the separator device through air displacement. The air displacement may be handled through a blower, which is controlled by the command unit. This step allows the measurement of the plurality of grains to be performed in an efficient and accurate manner.

A step of collecting 540 an image of the plurality of grains through the image collection device is performed when the plurality of grains is received in the measurement device. The images are collected by the image collection device, which may be a camera, for example, whereby the image collection device can collect, store, and/or send images to the command unit.

In an alternative embodiment, this step may be performed by a plurality of cameras and lenses, with assistance from the internal lighting device. Furthermore, after the collection, the motor performs a step of returning 550 the plurality of grains to processes that take place within or in addition to the measurement method.

The image collected by the image collection device is then sent to the command unit, where additional steps will be performed. In one embodiment, the command unit performs a step of measuring 541 the particle granulometry of each grain in the plurality of grains through the collected image. This step of measuring the particle granulometry is performed by a color segmentation process and a binary image edge segment topological structural analysis of the image of the plurality of grains collected. The color segmentation of the image of the plurality of grains collected may be, for example, a color segmentation in the HSV space.

This combination of color segmentation in the HSV space with a binary image edge segment topological structural analysis allows the command unit to perform additional steps, such as a step of extracting 542 the grain contour for each grain in the plurality of grains, for example, and a step of defining 543 the number of pixels occupied by each grain in the plurality of grains.

In one embodiment of the measurement method, after the calibration of the image collection device through the use of an object whose area is known, the command unit performs a step of defining 544 a pixel per milliliter ratio for each grain in the plurality of grains through the image of the plurality of grains collected. Defining 544 a pixel per milliliter ratio for each grain in the plurality of grains allows the command unit to identify 545 the real area occupied by each grain in the plurality of grains.

The calibration and definition of the pixel per millimeter ratio also allow the command unit to perform a step of defining 546 a minimum rectangle surrounding each grain in the plurality of grains through the image of the plurality of grains collected. Obtaining the minimum rectangle for each grain in the plurality of grains allows the magnitudes obtained to be correlated with a screen, an instrument at the prior art used to obtain the particle granulometry of the grain, more specifically cracked soybeans.

Having described an example of an embodiment, it must be understood that the scope of this invention encompasses other possible variations, being limited only by the content of the Claims appended hereto, with possible equivalents included therein.

The invention claimed is:

1. A grain collection, movement, and measurement system comprising:
   a grain collection device that comprises at least one valve configured to remove a plurality of grains from an external grain flow;
   a dosing device configured to dose a sample of grains from the plurality of grains collected;
   a separate device configured to remove unwanted particles from the plurality of grains by air displacement;
   a measurement device that comprises an image collection device configured to collect images of the sample of the plurality of grains analyzed; and
   a command unit connected to the grain collection device, the dosing device, the separate device and the measurement device whereby it controls the grain collection, movement, and measurement system, wherein the command unit is configured to receive the images of the sample of grains collected through the measurement device and perform a particle granulometry measurement of the sample of grains based on a color segmentation in an HSV space and a binary image edge segment topological structural analysis of the received images, wherein the command unit is configured to control the receipt and return of the plurality of grains in the grain collection, movement, and measurement system in an automated and continuous manner, wherein the command unit is further configured to, based on the collected images, generate a grain contour for each grain in the sample of grains, calculate the number of pixels occupied by each grain in the sample of grains, define a pixel per millimeter ratio for each grain in the sample of grains, define a minimum rectangle surrounding each grain in the sample of grains and correlate the minimum rectangle measurement of the sample with a screen, wherein the automated and continuous control of the grains by the command unit determine a mesh percentage distribution of the plurality of grains.

2. The grain collection, movement, and measurement system, according to claim 1, wherein the grain collection device comprises a set of piping with asymmetrical valves configured to direct the external flow of grains to the grain collection, movement, and measurement system.

3. The grain collection, movement, and measurement system, according to claim 1, wherein the separator device comprises a blower, wherein the blower provides the air displacement.

4. The grain collection, movement, and measurement system, according to claim 1, wherein the dosing device comprises at least one helicoidal thread and one motor connected to the helicoidal thread, wherein the helicoidal thread is moved by the activation of the motor, wherein the helicoidal thread regulates the quantity of grains in the grain sample plurality of grains analyzed.

5. A method for measuring grain particle granulometry performed by the grain collection, movement, and measurement system defined in claim 4, the method comprising the steps of:
   collecting an image of a sample of grains through an image collection device;
   measuring the particle granulometry of each grain in the sample of grains through the collected image, wherein the step of measuring the particle granulometry of each grain is performed by a color segmentation process in the HSV space and a binary image edge segment topological structural analysis of the image of the plurality of grains collected, wherein the step of measuring the particle granulometry of each grain further comprises the steps of:
   extracting a grain contour for each grain in the sample of grains;
   defining a number of pixels occupied by each grain in the sample of grains;
   defining a pixel per millimeter ratio for each grain in the sample of grains;
   identifying the actual area occupied by each grain;
   defining a minimum rectangle surrounding each grain in the plurality of grains through the image of the plurality of grains collected; and
   correlating the minimum rectangle measurement of the sample with a screen to determine a mesh percentage distribution.

* * * * *